ABSTRACT OF THE DISCLOSURE

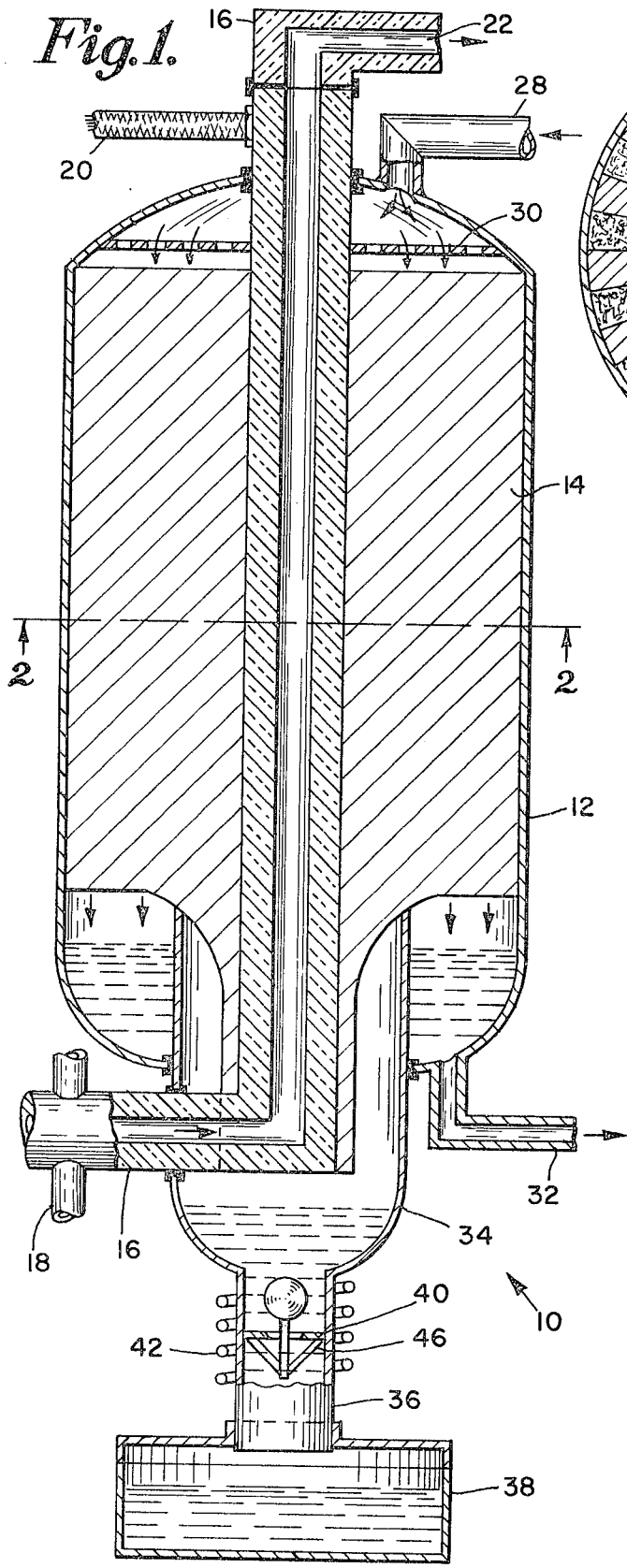
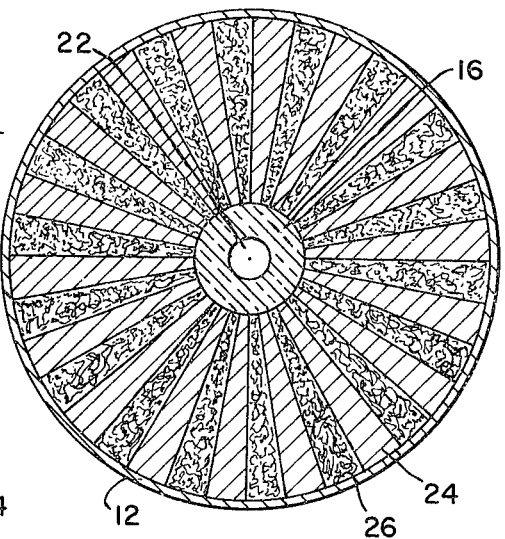
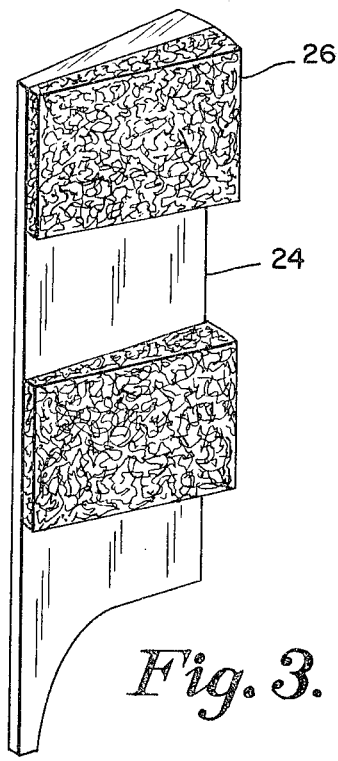
Fig. 1.
Fig. 2.
Fig. 3.
INVENTOR.
ROBERT KAISER
BY Charles M. Kogan
Abraham Ogman
ATTORNEYS ID 3,796,660
SEPARATION OF LIQUID-LIQUID
MULTIPHASE MIXTURES
Robert Kaiser, Cambridge, Mass., assignor to
Avco Corporation, Cincinnati, Ohio
Continuation-in-part of abandoned application Ser. No.
45,962, June 15, 1970. This application May 18, 1971,
Ser. No. 144,563
Int. Cl. B01d 17/04
U.S. Cl. 210—21                                    7 Claims

This process relates to separating multi-phase liquid-liquid mixtures such as emulsions and involves dispersing therein a ferrofluid preferentially soluble in one phase of the mixture and thereafter passing the mixture through a strong magnetic field gradient. The magnetic field serves to at least concentrate, often to separate out, the phase containing the magnetic particles therein. As little as 0.0001% by volume of magnetic particles in one phase is adequate for significant phase separation by a strong magnetic field gradient.

---

This application is a continuation-in-part of Ser. No. 45,962, filed June 15, 1970, now abandoned.

This invention is directed to a method for separating multiphase liquid-liquid mixtures and in particular to the use of ferrofluids and magnetic forces for effecting phase separation.

The gist of the present invention may be briefly stated. It involves adding a ferrofluid to the liquid multiphase mixture in quantities adequate to provide at least 0.0001% by volume of magnetic particles in one of the liquid phases of the mixture. The ferrofluid must be preferably soluble in that one phase. The mixture is then brought into contact with a strong magnetic field gradient. The magnetic gradient applies selective force which concentrates the magnetic phase allowing thereby separate recovery of two phases.

The separation of multiphase liquid mixtures is a common problem that has no generally applicable solutions. The existence of multiphase liquid mixtures is pervasive. In recent years, the need to separate such mixtures into their component liquids has been discussed in almost crisis terms. For example, pollution problems associated with the petroleum industry such as oil tanker ballast water dumping in the open seas are of major public concern. Less well-publicized but of major importance are the many multiphase liquid mixtures that find their way from industrial installations into the waterways of virtually every nation, spent water dispersible industrial lubricants just to name a major instance. Emulsion technology is widely used in the material processing industries. While such emulsions may not be part of the pollution problem, nonetheless, phase separation is often required during the course of many manufacturing schemes. For example, milk and cream are oil in water (o./w.) emulsions, butter is a water in oil (w./o.) emulsion. Deliberate or inadvertent formation of emulsions is common in the pharmaceutical industries. Biomedical research often encounters emulsions of unusual liquids for example, fluorocarbon liquids suspended in biologic fluids.

The present invention is believed to be applicable to all multiphase liquid mixtures, including coarse suspensions, fine suspensions and stabilized suspensions. Often, the multiphase liquid mixtures are emulsions, an emulsion here being a multiphase liquid mixture wherein a significant fraction of disperse phase is present as droplets smaller than 10 microns.

Due to their small droplet size, emulsions present the most difficult separation problem. One aspect of the difficulty is that the constituent liquids of most common emulsions do not differ enough in density for gravity settling. All known methods for breaking emulsions (including chemical, mechanical, electrical and thermal treatments) suffer variously the disadvantages of specificity, inefficiency, complex high speed machinery, and the consumption of expensive treating agents, all of which make these methods expensive and limits their practical application, as witness the widespread pollution problems occasioned by wasted emulsions.

The present invention is largely based on the existence of a recently discovered class of materials known as ferrofluids. Briefly stated, a ferrofluid is a stable suspension of finely divided magnetic particles in a carrier liquid. Characteristically the suspension or colloidal dispersion does not settle out under the influence of gravity and no interaction between the particles occurs even in a magnetic field. Within the context of the present invention, the finely divided magnetic particles include the materials usually recognized as being ferro or ferrimagnetic, such as magnetite, gamma iron oxide, metallic iron, etc., and more generally any material having a saturation magnetization at room temperature in excess of 1,000 Gauss. This class of materials includes also cobalt, nickel, gadolinium, samarium-cobalt and similar alloys, chromium dioxide, ferrites, such as manganese-zinc ferrite, manganese ferrite, nickel ferrite, and many other materials. The preferred materials for practice of the present invention are magnetite and gamma iron oxide.

The particles suspended in ferrofluids are very small. The particle size is normally less than about 1000 A. and can be as small as 25 A. For magnetite, for example, the particle size will average about 50–150 A. The range will differ with other materials. To repeat, ferrofluids are now well known in the art and are described in detail in numerous patents and publications. However, the actual ferrofluid preferentially solube in one or another phase of the mixture being treated may have to be formulated specially for that mixture. Fortunately ferrofluids are not limited to any particular type or types of carrier liquids so that working out a special ferrofluid formulation for a particular separation should be no insurmountable problem.

It has been discovered that a surprisingly low differential concentration of magnetic particles in one phase of a mixture makes the mixture amenable to magnetic concentration of that phase, i.e., creaming or actual separation. A single magnetic particle in a 10-micron droplet and a strong magnetic field gradient is adequate to overcome the dispersing effect of Brownian movement on the droplet. Concentrations as low as 0.0001% by volume of magnetic particles in one phase of a mixture is contemplated for practice of this invention.

For logistic and economic reasons, it is manifestly desirable to add as little ferrofluid as reasonably possible to whatever mixture is being treated. The minimum quantity of ferrofluid necessary to achieve significant results can be just enough to provide about the aforementioned 0.0001% by volume of magnetic particles in the phase wherein the ferrofluid is preferentially soluble. Such a small concentration does, of course, require powerful magnetic forces. As a practical matter, if the expense of incorporating ferrofluid in a particular mixture is justified by the circumstance, then enough should be added for facile separation by the readily available magnetic forces. The general range of magnetic particles contemplated for preferred practice of the present invention is 0.001% to 0.5% by volume of magnetic particles in the final mixture of ferrofluid and the emulsion phase preferentially soluble therewith. In some instances, a concentration of up to about 4.0% may be employed.

To repeat, the minimum concentration of magnetic particles in the final mixture of 0.0001% by volume is predicated upon the discovery that one magnetic particle per droplet will suffice to counteract Brownian movement when high magnetic forces are applied to the droplet. A magnetic field gradient applied to a liquid-liquid multiphase mixture in which one of the phases is made magnetic by presence of ferrofluid therein tends to draw the magnetized phase to the zone of maximum field. The motion of a spherical drop of magnetic liquid in a non-magnetic liquid under the influence of a non-uniform magnetic field can be considered in a fashion similar to the settling of such a drop due to gravity of centrifugal force in a centrifuge.

The magnetic force $F_m$ acting on the spherical drop of diameter $d$ can be expressed as:

$$F_m = \frac{\pi d^3}{6} \left( \frac{\overline{M}}{4\pi} \frac{dH}{dx} \right)$$

where $\overline{M}$ is the average magnetization of the drop in the applied local magnetic field H and $dH/dx$ is the local gradient of magnetic field in the X direction. $F_m$ tends to pull the drop to the region of maximum field.

The magnitude of the forces involved can be seen by an exemplary instance of a magnetic oil containing 1% by volume magnetite, a density of 0.96 g./cm.³ suspended in water of density 1.00 g./cm.³, and an assumed local gradient of 10,000 oe./cm. and high enough to saturate the fluid (H>5000 oe.) so that $\overline{M}$ is equal to 56 gauss. Under these conditions, the magnetic force is over one thousand times greater than the force due to gravity.

The same forces apply to a non-magnetic drop dispersed in a magnetic liquid, i.e., a magnetized external phase in the mixture. The signs are reversed and the non-magnetic drop is expelled to a region of minimum field. For more detailed discussion on expulsion of non-magnetic particles, reference is made to U.S. Pat. 3,488,531.

Regardless of the constituents and other specific circumstances of any particular mixture, magnetic concentration or separation according to practice of this invention is believed possible. This is because almost all liquids exhibit insignificant diamagnetic or paramagnetic characteristics and because colloidal magnetic particles can be suspended in many, many liquids, thus making such a liquid a ferrofluid. It is therefore possible to tailor a ferrofluid that is preferentially soluble in one or another of the phases in any particular liquid-liquid multiphase mixture. In addition, other physical characteristics of a ferrofluid can be preselected over a wide range of properties, so a ferrofluid reasonably optimum for the separation problem at hand can be formulated.

The present invention can be set forth, as above, much more easily than the practice thereof can be described. All too often a specific mixture which must be separated presents a highly complex set of circumstances. Required may be detailed consideration of the choice and physical characteristics of the ferrofluid, mode of ferrofluid addition to the mixture, and operation of the magnetic separation. Accordingly, for further understanding of what is involved, a detailed description of the practice of this invention, which follows, is posed largely within an exemplary context of magnetically separating petroleum oils from tanker ballast. Such mixtures are of world-wide pollution concern. However, to repeat, this invention is of general applicability and, in documentation thereof, considerations involved in separation of other specific multiphase liquid-liquid mixtures will subsequently be described, but in less detail.

Ocean going shipments of crude oil and of various refined petroleum products involve oil shipments in one direction then water ballast on the back haul in the same tanks. The ballast is usually sea water and must be discharged prior to taking on a new oil cargo. In consequence, ballast water becomes contaminated by what ever residual oil is present in the emptied tanks; moreover, the oil cargo may become contaminated with residual water left after the ballast is discharged. Frequently, an oil-water interface is present in the tanks when carrying oil or when carrying water ballast. On the hydrocarbon side of the interface a thixotropic water in oil emulsion (commonly called chocolate mousse) may occur. On the water side of the interface a mixture of oil and water exists. For convenience, all such mixtures may be termed petroleum oil/water emulsions. Ballast dumping is a common source of the pollution which fouls beaches and destroys ocean sea life, the oil content of the ballast is often too much for a rapid complete dispersion and disappearance in ocean waters.

In terms of the present invention, it is noteworthy that emptying the tanker always leaves behind some oil, about 0.1–1.0% of the tank volume, clinging to the sides and bottom of the tank. For the moment, the clingage is essentially free of water and available for introduction of a ferrofluid therein. According to one preferred embodiment of the invention, a ferrofluid is added to the clingage before ballast water is introduced into the tank. As a result, after ballast water is introduced, the oil disperse phase of the consequent petroleum oil/water emulsion is magnetically susceptible to recovery by on-board separations during the back haul trip. The magnetic separation treatment of the ballast leaves behind a ballast water clean (of petroleum oil) enough for discharge into the sea without pollution consequences.

The ferrofluids so employed for this particular petroleum oil/water emulsion should have certain physical attributes. Specifically, they must be miscible with a wide range of petroleum oils, e.g., fuel oils, crude oils. Desirable, but not necessarily so, they should be less dense than fresh water or sea water. The ferrofluids should have a high interfacial tension against water so as to not further promote the tendency of the oil and water to emulsify. They should also have a high magnetic susceptibility. Also desirable for safety reasons are such things as an absence of toxicity and a high flash point. Many of the ferrofluid characteristics outlined above involve properties of the carrier liquid and in consequence only a relatively small group of materials are preferred for use as the carrier liquid for ferrofluids used to separate these petroleum oil/water emulsions.

Specifically, the materials most useful as carrier liquids are paraffins and naphthenes, i.e., aliphatic and cyclic saturated hydrocarbons, having a boiling point in excess of about 100° C., but not so high in molecular weight as to have a viscosity in excess of 5 centistokes at 30° C. The preferred carrier liquids may also be described in more strictly chemical terminology as being paraffin hydrocarbons (or aliphatic) from about $C_9$–$C_{21}$ and the saturated naphthenic hydrocarbons from about $C_7$–$C_{18}$. All isomeric forms are suitable, i.e., straight chain, branched, monocyclic, bicyclic, etc. Such materials are normally available as mixed hydrocarbons, e.g., white oil, rather than as pure compounds. Actually, hydrocarbon mixtures are preferred over a pure hydrocarbon compound. The mixtures have lower pour points and a better controlled evaporation rate. Mixtures are a lot cheaper than the pure compounds.

Surprisingly, even closely related materials fall outside the scope of the carrier preferred for this petroleum oil/water separation. For example the $C_9$–$C_{21}$ oilfins are less stable, more water soluble, and in addition, they spread on the water more readily than do the paraffins or naphthenes. Aromatic hydrocarbons are particularly undesirable. They are more soluble in water than the corresponding saturated hydrocarbons. They are toxic to sea life and pose danger to those handling the ferrofluid. In addition, the aromatics have lower interfacial tension against water than the corresponding saturated hydrocarbons of equal molecular weight. Chlorinated hydrocarbons are too dense, too toxic and too expensive. Still other solvent systems have been investigated for the carrier liquid purposes, e.g., ethers, esters, amines, heterocyclics, but for one reason or another have proven less than satisfactory. Accordingly, practice of the present invention for separation of petroleum oil/water emulsions involves a greatly preferred carrier liquid selected from the above described group of paraffinic hydrocarbons, naphthenic hydrocarbons, and mixtures thereof.

However, selection of a preferred carrier liquid for the emulsion being separated will not in itself provide a forrofluid with all the requisite physical attributes. Some attributes are provided by proper selection of the stabilizing ingredient employed in formation of the ferrofluid.

The specific problems involved in separating these petroleum oil/water emulsions tend to impose certain physical requirements on the preferred surfactant which is present in the ferrofluid to stabilize the suspension of finely divided magnetizable particles in the carrier liquid, just as they have posed requirements for what is a preferred carrier liquid. Thus, the surfactant must be hydrocarbon oil soluble and water insoluble. A solubility of less than 0.5% by weight in water constitutes a reasonable numeric criterion for what is water insolubility. In addition, the surfactant must not result in undue lowering of the interfacial tension of ferrofluid against water or of the oil-ferrofluid mixture against water. Desirably, the surfactant itself should be non-toxic.

The criteria of oil solubility and water insolubility are well known physical properties which need no explanation or discussion. However, the requirement of controlled interfacial tension so significant within the context of preferred practice of the present invention for separation of this exemplary petroleum oil/water emulsion needs explanation, perhaps a definitive description.

Formation of an emulsion of any two immiscible liquids involves the creation of a large interfacial area between the two phases. Addition of some agent which significantly lowers the interfacial tension between the two phases will promote emulsification. Surfactants, i.e., surface active agents, lower the interfacial tension between oil and water, thereby facilitating formation of oil/water emulsions and stabilizing of same. Many stabilizing agents suitable to formation of the stable colloidal suspension of magnetic solids (which is what a ferrofluid is) also are good oil-water emulsifying agents. Since the object is to break the petroleum oil/water emulsions, inclusion of ferrofluid therein should not make the emulsion more difficult to break, e.g., by further lowering interfacial tension.

The usual petroleum oil/water emulsion; particularly of crude oils is due to naturally occurring surface active agents which lower the oil/water interfacial tension. For many crude petroleum products, e.g., heavy fuel oils, the oil/water interfacial tension is below 20 dynes/cm. By comparison, the saturated hydrocarbons most suitable as the ferrofluid carrier liquid for hydrocarbon/water emulsion separation have oil/water interfacial tensions of about 50±5 dynes/cm. Certainly any ferrofluid contemplated for this separation should have a ferrofluid/water interfacial tension higher than that of the petroleum oil in the emulsion. When the interfacial tension of the ferrofluid is higher than that of the petroleum oil, then the problems of emulsion stability cannot be expected to worsen when ferrofluid has been included in the emulsion.

Introduction of a small amount of a surface active agent into a hydrocarbon oil will reduce the interfacial tension of that oil against water due to concentration of the surfactant at the oil/water interface. Since the continuous phase of an oil based ferrofluid is a hydrocarbon oil solution of surfactant, the ferrofluid/water interfacial tension will reflect the presence of the surfactant and be a function of how much free surfactant is present in the carrier hydrocarbon oil. Fortunately, many surfactants are so firmly adsorbed on the magnetic particle surfaces that the concept of free surfactant is meaningful and the ferrofluid can be treated as a hydrocarbon oil solution of surfactant.

The initial change in interfacial tension, $\gamma^1$ o./w. of a hydrocarbon oil solution of surfactant against water at very low surfactant concentrations, decreases as a linear function of surfactant concentration, $c$ (moles/liter), in the oil. This relationship has been expressed mathematically as follows:

$$\frac{d\gamma^1 o./w.}{dc} = -A$$
$$c \to 0.$$

Many surface active agents widely different in chemical structure have similar values of A. Since the interfacial tension characteristics of the ferrofluids are primary considerations for separating ballast petroleum oil/water emulsions, preferred surfactants suitable for the ferrofluids can be defined in terms of this characteristic as follows:

(a) The surfactant has a value for $$A \leq 10^5 \frac{\text{dynes/cm.}}{\text{mole/liter}}$$

(b) The ferrofluid as a whole has an interfacial tension against water not less than about 25 dynes/cm.

Looking further at the question of interfacial tension, it is noteworthy that while introduction of small amounts of surfactant materially affect an oil/water interfacial tension, there is little or no effect on the oil/air interfacial tension. As a result, the spreading behavior of the ferrofluids on water may be taken as reasonable measure of the ferrofluid/water interfacial tension.

When a given volume of an oil is placed on the surface of water, which is a denser immiscible liquid so that it is initially present in a layer of appreciable thickness, several possibilities exist as to what may happen next. These phenomena are best treated in terms of the "spreading coefficient," a concept originally proposed by Harkins (Harkins, W. D., J. Chem. Phys., 9, 552 (1941)). By definition, $$S.o./w. = \gamma w. - \gamma o. - \gamma o.w.$$

where

S.o./w.=spreading coefficient of the oil on water, dynes/cm.
$\gamma$w.=surface tension of water against dry air, dynes/cm.
$\gamma$o.=surface tension of the oil against air, dynes/cm.
$\gamma$o.w.=interfacial tension of the oil against water, dynes/cm.

A positive value of S.o./w. indicated that spreading of the oil on water is accompanied by a decrease in free energy of the system, so that the oil will spread spontaneously on the water surface until it is present as a thin film of molecular dimensions.

Conversely, a negative value of S.o./w. indicates that the spreading of the oil on water would be accompanied by an increase in free energy. Therefore, the oil will not spread on the water but remain as a stable lens, its equilibrium configuration being dictated by the boundary tensions, the gravitational potential energy of elements of volume and the pressure differences across the curved surface. The carrier liquids employed in this invention have a zero or negative spreading coefficient against distilled water at ambient temperature.

A similar definition of the spreading coefficient (S.'$\gamma$ o./w.) applies for an oil containing a surface active solute which alters the oil/air ($\gamma'$ o.) or oil/water ($\gamma'$ o.w.) interfacial tension.

Here, introduction of a small amount of surface active agent in the oil will have no effect on the oil/air interfacial tension so that $\gamma'$o.=$\gamma$o. However, even small concentrations of a surface active agent which adsorb at the oil/water interface can markedly reduce the surface tension of the oil ($\gamma'o./w.<\gamma o./w.$) and thus, the spreading coefficient of the solution. S.'o./w. will be greater than that of the carrier liquid. When $$|\gamma o./w.-\gamma' o./w.| \geq |S.o./w.|$$

the oil solution will no longer form a stable lens, but will spread spontaneously on the aqueous substrate. Examination of the vast body of literature (see for example, Zisman, W. A., J. Chem. Phys., 9,729 (1941)) on the spreading characteristics and interfacial tension measurements of oil/water systems indicate that the initial change in spreading coefficient of a hydrocarbon oil/surfactant solution on water at very low surfactant concentrations, varies as a linear function of the surfactant concentration, c (moles/liter), in the hydrocarbon oil with the compositon of the hydrocarbon oil itself having little effect. This can be expressed mathematically as follows:

$$\frac{dS.'o./w.}{dc}\bigg|_{c \to 0} = -A$$

Since there are many surface active agents which are widely different in chemical structure, but have similar values of A, and since the spreading characteristics of the ferrofluid are of primary consideration here, the surfactants which can be used in context of the present invention can be defined as having a value of $$A \leq 10^5 \frac{dynes/cm.}{mole/liter}$$

A realistic screening test to determine whether a given surfactant meets the above requirement would be to determine the concentration of the surfactant in a non-spreading paraffin hydrocarbon oil which results in a solution that spreads on distilled water at ambient. Since the spreading coefficient of the pure hydrocarbon is known, A is easily determined. A representative hydrocarbon liquid for these tests is tetradecane, (S.o./w.= —6.4 dynes/cm.)

Gillap, W. R., Weiner, N. D. and Gibaldi, M., J. Am. Oil Chemist Soc., 44, 71 (1967); for decahydronaphthalene the value is —11 dynes/cm.

To repeat, physical characteristics like oil solubility, water insolubility and spreading coefficient are the criteria for the surfactants suitable in cleaning up ballast water. Extensive tests have indicated no adequate chemical basis for selecting those surfactants most suitable for forming ferrofluids and then picking the particular surfactants usable in the ferrofluids required for separation of petroleum oil/water emulsions or more generally for practice of the present invention.

Fortunately, the surfactant art is most extensive, the literature thereon voluminous, and the surfactant compounds legion. A tremendous number of diverse materials have surface active properties and can be identified as being surfactants, e.g., fatty acids, alcohols, amines, amides, alkyl phenols, other organic acids, polyacrylates, just to name some. One possible chemical correlation indicated by tests and theoretical studies on ferrofluids is the apparent need for at least a 12 carbon atom chain in the surfactant, but this need appears related more to colloid stabilization in all ferrofluids than to the special ferrofluid requirements for this separation. To repeat again, the only basis found for inclusion or exclusion of a particular surfactant capable of forming a ferrofluid in this separation or the separation of any multiphase mixture are the physical requirements of preferential solubility in one phase, and, desirably, a spreading coefficient which does not make for increasing the degree of emulsification of the two or more liquid phases. In terms of ballast water emulsions, this means: hydrocarbon oil solubility, water insolubility and a low spreading co-efficient. As at least a point of preferred practice for this separation, the surfactant employed in the ferrofluid should exhibit irreversible adsorption on the magnetic particle surface.

More must now be said about the spreading coefficient. The rationale underlying a numeric limitation for the spreading coefficient resides in the character of all petroleum oil/water emulsions. They may be mixtures, they may be stable emulsions. In either event, the ferrofluid should not disperse more oil in the water or form a more stable emulsion of oil in water or water in oil. Yet the ferrofluid must come into contact and disperse in the oil, so some surface activity is desired.

It follows then that part of the physical criteria for the ferrofluid, one relating to the surfactant, is a substantial and real limitation on its content. The ferrofluids suitable for deoiling ballast water should contain a carefully controlled proportion of surfactant. In practical terms, the proportion of surfactant is lower than usually is present in ferrofluids.

Here too, elaboration may be required. A ferrofluid is a colloidal dispersion of magnetic particles in a carrier liquid stabilized by the surfactant. The surfactant and the magnetic particles can be considered as joined, even reacted. However, the system is dynamic with some of the surfactant in free solution, some firmly attached, some loosely attached and at all times partitioning between adsorption at the surface of the magnetic particles and free solution in the carrier. The surfactant in free solution is available for surface action at the emulsion interface. In formulating the usual ferrofluid the primary concern is achievement of colloid stability; and substantial excess of surfactant is included as a matter of course. For the tanker ballast problem, an almost equal concern exists about avoiding presence of excess surfactant. Only enough surfactant is present for colloid stability.

If the surfactant exhibits irreversible adsorption on the surface of the magnetic particles, then the total surfactant content in the ferrofluid may approximate the bound up surfactant without need for enough surfactant to counter also dilution factors, e.g., the effect of adding ferrofluid to a petroleum oil/water emulsion, and to counter the effect of an oil/water interface.

The spreading coefficient alluded to above can be employed as a test on the ferrofluid to determine surfactant suitability. In the instance of petroleum oil/water emulsions, the spreading coefficient against distilled water at ambient temperature should not exceed about 20 dynes per centimeter.

The spreading coefficient of a candidte ferrofluid surfactant may be obtained by direct measurement of the surface tension and the interfacial tension against water of the ferrofluid by standard analytical methods (which, however, are time consuming and require great skill). A simple screening test which accomplishes the same goals is to dilute a ferrofluid with a given volume of a non-spreading hydrocarbon solvent and determining whether a drop of the resulting mixture spreads on distilled water. If it is assumed that S.o./w.–S.'o./w. is proportional to the free surfactant concentrations, the ratio of ferrofluid to diluent solvent is determined by the limit of 20 dynes/cm. chosen for the ferrofluid and the spreading coefficient of the pure diluent hydrocarbon solvent. With tetradecane as the test liquid, a drop of a mixture of 1 volume of the candidate ferrofluid with three volumes of pure tetradecane should not spread on distilled water at ambient temperature in order for this ferrofluid to meet the requirements of the present invention.

As a proviso, it may be noted that the ferrofluid usually contains far more than a negligible concentration of surfactant in the carrier liquid, but that substantially all of the surfactant is bound to the magnetic particles. In effect, the spreading coefficient test shows that virtually no free surfactant is present in the ferrofluid (typically less than $10^{-2}$ moles/liter).

Although only the above-identified physical characteristic for the surfactant in ferrofluids are crucial, preferred surfactants for any petroleum oil/water emulsions can be identified in chemical terms. They are carboxylic acids $C_{12}$ and higher, saturated or unsaturated, natural or synthetic, in origin including for example, oleic acid. The carboxylic acids may be even be very high molecular weight carboxylic acids (such as for example the polyisobutene acids disclosed in British Pat. 1,075,121). The preferred suitability of the $C_{12}$+ carboxylic acids as a class with no upper limit further illustrates the extent to which the surfactant cannot be defined in chemical terminology. The true upper limit for the number of carbon atoms in the carboxylic acid chain is again a physical parameter, i.e., the oil insolubility of very high level molecular weight carboxylic acids. Also preferred are the $C_{12}$ and higher fatty alcohols and alcohol esters. Further identification of preferred surfactants does not appear warranted in light of the tremendous extent of the literature on oil soluble, water insoluble surfactants and on the virtually infinite number of surfactants which can be made.

Some discusssion is required about the proportion of magnetic particles in the ferrofluid. Obviously, as much as possible is best, but the upper limit for a realistic ferrofluid is set by the specific gravity of the ferrofluid. For example, ferrofluid formed in the paraffins and naphthenic hydrocarbons described above can be formulated with specific gravity far in excess of that of sea water, e.g., specific gravity 1.5, particle content about 15% by volume. Certainly, in terms of shipping, the highest possible concentration of magnetic particles might be advantageous, but as a practical matter for separating petroleum oil/water emulsions, a density limit of sea water and of fresh water exists for marine and fresh water application respectively. It is desirable that the ferrofluid and petroleum/oil phase have similar densities to facilitate mixing of the two oil phases. Thus, with oils less dense than water, the ferrofluid should be less dense than water so that the water phase will not be a physical barrier to mixing. The reverse is true with the few oils denser than water. Numeric concentration ranges in terms of percent by volume of magnetic particles per part of carrier will depend on the individual carrier liquid and therefore even a preferred range is imprecise, almost arbitrary. Generally, the concentration of magnetic particles in the carrier should be from about 3% to 10% by volume. The actual upper limit for specific gravity, i.e., a density just below 1 gr./cm.$^3$ or 1.03 gr./cm.$^3$, will depend upon the density of the carrier, the density of the surfactant and the density of the magnetic material. Although, to repeat, ferrofluids containing as much as 20% by volume of magnetizable material have been made in these hydrocarbon carriers and 40% content is believed theoretically possible. In passing, it is noted that high particle content ferrofluids tend to be relatively viscous. However, viscosity considerations have not been found to be material with the relatively low particle content ferrofluids consistent with a specific gravity of about 1.

The ferrofluids described above are particularly advantageous for treatment of petroleum oil/water emulsions. They are essentially insoluble in water, soluble in hydrocarbon oils. They are specifically adapted to the instance of oil tankers where the situation usually permits a facile incorporation of ferrofluid directly into the petroleum oil prior to ballasting with water. The ferrofluid disperses in the residual oil therein before any oil-in-water emulsions form.

Complete dispersion of the ferrofluid converts the oil phase into a more dilute ferrofluid with magnetic particles in stable colloidal dispersion therein. When the subsequently produced oil/water emulsion is later passed through a strong magnetic field, the oil will be affected but not the water. In effect, the oil will be dragged out of the water phase.

A further major instance of petroleum oil/water emulsions are the oil spills which occur so frequently. The oil spreads over the water surface, floating thereon as a relatively thin layer. The usual clean up mode involves mopping up the oil films. According to copending application Ser. No. 46,558, filed June 15, 1970, the oil film may be treated with the above described ferrofluids and collected magnetically. According to practice of this invention, the ferrofluid treated oil film may be scooped up non-magnetically necessarily taking with it large quantities of water. The petroleum oil/water mixture can then be magnetically separated on board in the same fashion as ballast water emulsions are separated.

It may be noted that operating in a reverse fashion, namely using a water based ferrofluid and making the water phase magnetic is not suggested for ballast water separation. Many reasons exist for preferring operation with an oil base ferrofluid. For example, ballast water emulsions have a larger water than oil content which would require more ferrofluid. Also, the removed water has no value and must be discarded, whereas a hydrocarbon oil base ferrofluid adds to the fuel values of any recovered petroleum oil and, moreover, since the water phase is often saline, colloid stablization (of the ferrofluid) is troublesome.

Any hydrocarbon oil based ferrofluid left in the discharge ballast water does not constitute a serious pollutant. The carrier is volatile enough to evaporate in time. Biodegradable surfactants, e.g., oleic acid, can be employed. The magnetic particles are the only true residue and these will form an almost insignificant (non-toxic) inorganic addition to the silt on the ocean, lake or river bottom.

Often the circumstances will not allow for incorporation of ferrofluid in one phase of the mixture before the multiphase mixture is formed; citing for examples such other well known petroleum oil/water mixtures as oily bilge water, refinery waste streams, oil field emulsions. In some petroleum oil/water mixtures, the above described hydrocarbon based ferrofluids may be employed for separation purposes, particularly if the mixture is not a stabilized emulsion. Addition of the ferrofluid along with vigorous agitation may suffice to preferentially dissolve the ferrofluid into the oil phase. Sometimes, as for example when a stabilized petroleum oil/water emulsion is encountered, the above hydrocarbon based ferrofluids may be employed only in conjunction with emulsion breaking techniques, e.g., heating.

Despite the detail with which they have been described, the above hydrocarbon based ferrofluids are but the specific preferred class of ferrofluid for ballast water separation. Some petroleum oil/water emulsions will require completely different ferrofluids for magnetic separation. Expressly contemplated, for example, is use of a water based ferrofluid so that the water phase of a petroleum oil/water mixture (usually an emulsion) is made magnetizable. Although this approach is manifestly unsuitable for ballast water treatment, situations exist wherein small amounts of water have become emulsified in petroleum oil.

To repeat, practice of this invention involves incorporating a ferrofluid differentially into one phase of a liquid-liquid multiphase mixture. The ferrofluid must be preferentially soluble in one phase making such phase more magnetizable than the mixture as a whole. In theory, presence of a third phase, a fourth phase, etc., does not matter. If they are too miscible with the ferrofluid, they too preferentially take up ferrofluid and become magnetizable; otherwise, they remain dispersed in the magnetically unconcentrated portions of the mixture. In terms of the intended scope of this invention, all multiphase liquid-liquid mixtures are assumed to have but two phases, one of which can preferentially incorporate the ferrofluid therein and become more magnetizable than the other phase. In actual practice of this invention, any additional phases in the mixture must, of course, be considered and the magnetic separation tailored to include or to exclude the additional phases in the magnetically concentrated portion, whichever is more expedient for the particular mixture at hand. Presence of additional phases is simply one of the many factors which must be taken into account in selecting a ferrofluid which will become differentially incorporated into one phase, and not become a separate essentially pure ferrofluid phase in the liquid-liquid multiphase mixture.

The mixture can have solid particles suspended therein, salts dissolved in at least one phase, even gases dissolved or dispersed (froth) therein. Sometimes, a proposed separation is not materially affected by such factors as, for example, the above described treatment of ballast water, wherein the water content of the petroleum oil/water mixture can be fresh water or sea water. Particularly complex water phases are encountered in fluorocarbon/water mixtures as when, for example, the water phase is a biologic fluid, this being a situation encountered in medical research. The composition of each phase as well as the character of the mixture as a whole must be taken into account in selecting a ferrofluid which will become differentially incorporated into one phase.

Fortunately, an almost across the board approach can sometimes be adopted to a whole class of separation problems. One widespread situation involves recovery of water dispersible lubricants, e.g., metal processing oils, from stabilized emulsions. Such emulsions are not necessarily petroleum oil/water emulsions. For example, a typical rolling oil is a dilute emulsion of about a 50/50 mixture of lard oil and mineral oil. Of course, the ferrofluid must be formed in a carrier differentially soluble in one phase, normally the oil phase. The carrier selected may be, for example, some compound or fraction present in the lubricant composition. However, the surfactant and surfactant concentration is predicated upon a different basis than was described above for ballast water operation. One approach is to employ a ferrofluid stabilizing surface active agent which is antagonistic to the emulsion stabilizer in the lubricant, e.g., cationic for anionic emulsions, anionic for cationic emulsions. The ferrofluid may deliberately include an excess of surface active agent, enough to distabilize the lubricant/water emulsion and still maintain ferrofluid stability. Another approach is to prepare the ferrofluid with a non-ionic stabilizer (in minimum proportions) then load the ferrofluid with the antagonistic surfactant. Still another approach is use of a water dispersible ferrofluid to make the water phase magnetizable.

Use of antagonistic surfactants to distabilize soap stabilized emulsions is a well known expedient in the art, and need not be described in detail. Suffice it to state by way of detailed exemplary discussion only that this prior art practice is used under the usual conditions and proportions changed only by using ferrofluid to carry the antagonistic surfactant into the emulsion and enough ferrofluid is used to incorporate at least 0.0001%, preferably 0.005%, magnetic particles in one phase.

Since the detailed consideration needed for each liquid-liquid multiphase mixture is mostly reflected in the character of the ferrofluid selected, it is most important to appreciate that ferrofluids have been formed in almost every conceivable liquid: hydrocarbons, substituted hydrocarbons, esters, alcohols, ketones, silicones. Fluorocarbon based ferrofluids have also been made. Water based ferrofluids have been made with surfactant stabilization and also with ionic stabilization. The hydrocarbon based ferrofluids discussed in detail above are simply exemplary of the almost infinite variations possible in ferrofluid characteristics. It is existence of such variation which makes possible practice of this invention.

For further understanding of this invention, the following specific examples are presented:

EXAMPLE I

A series of oil based ferrofluids were formed by ball milling finely divided magnetite, carrier liquid and stabilizing agent (surfactant). Details of the individual ferrofluids are tabulated below. (Table I-A, I-B, I-C.)

TABLE I-A

| Run | Overall composition | | | | | | Principal physical properties | | | |
|---|---|---|---|---|---|---|---|---|---|---|
| | Magnetite size, A. | Volume, percent | Stabilizing agent | Volume, percent | Carrier liquid | Volume, percent | Density, gm./cm.³ (25° C.) | Kinematic viscosity, cs., 30° C. | Initial susceptibility | Saturation magnetization, gauss |
| -1a (1102) | 88 | 1.4 | PIBSA | 5.3 | Kerosene | 93 | .844 | 4.1 | 0.10 | 43 |
| -1b (1103) | 88 | 2.6 | PIBSA | 9.9 | do | 87 | .878 | 6.0 | 0.19 | 80 |
| -1c (1104) | 88 | 5.7 | PIBSA | 27.1 | do | 73 | 1.01 | 53 | 0.40 | 172 |
| -2 (1105) | 84 | 6.7 | PIBSA | 17.1 | Methyl cyclohexane | 75 | 1.096 | 54 | 0.47 | 195 |
| -3 (1106) | 84 | 5.0 | PIBSA | 12.8 | Decahydronaphthalene | 82 | 1.068 | 32 | 0.35 | 150 |
| -4 (1107) | 84 | 4.6 | PIBSA | 11.7 | Tetradecane | 84 | 0.962 | 32 | 0.32 | 138 |
| -5 (1108) | 85 | 3.0 | PIBA | 7.5 | Kerosene | 90 | 0.915 | 6.8 | 0.18 | 80 |
| -6 (1109) | 80 | 4.8 | Oleic acid | 11.0 | Tetradecane | 84 | 0.965 | 3.6 | 0.17 | 131 |
| -7 (1110) | 70 | 1.1 | Dodecyl amine | 2.0 | Decahydronaphthalene | 97 | 0.897 | 5.6 | .03 | 28 |
| -8 (1111) | 84 | 3.4 | PIBSA | 8.6 | Kerosene | 88 | 0.972 | 5.1 | 0.24 | 100 |

TABLE I-B.—PROPERTIES OF STABILIZING AGENTS USED TO PREPARE TEST FERROFLUIDS

| | Oleic acid (purified) | Polyisobutene acid (PIBA) | Polyisobutene succinic acid (PIBSA) | Dodecyl amine (DA) |
|---|---|---|---|---|
| Source | Fisher Scientific Co. | Enjay Chemical Co. | Enjay Chemical Co. | Fisher Scientific. |
| Molecular weight | 282 | 1,000 peak | 1,000 peak | 185. |
| Acid number (ASTM D-664) (where applicable) | 198 | 30-45 | 105-20 | N.A. |

TABLE I-C.—DESCRIPTION AND PROPERTIES OF CARRIER LIQUIDS USED TO PREPARE TEST FERROFLUIDS

| | Refined kerosene | n-Tetradecane | Methyl cyclohexane | Decahydronaphthalene |
|---|---|---|---|---|
| Source | Humble Oil & Refining | Eastman Kodak | Fisher Scientific Co | Fisher Scientific Co. |
| Category | Mixed paraffins | Paraffin | Monocyclic branched naphthene | Bicyclic naphthene. |
| Density (25° C.) gr./cm.³ | 0.786 | 0.759 | 0.765 | 0.877. |
| Viscosity (30° C.) cs | 1.9 | 2.3 | 1.1 | 2.1. |
| Boiling point, ° C | 205-254 | 254 | 100 | 187-195. |
| Spreading coefficient (of sample on distilled water at room temp.). | S<0 | S<0 | S<0 | S<0. |

With all the ferrofluids described in Table I-A, the drop did not spread on distilled water, passing the spreading test, and indicating thereby the presence of very little free surface active material in solution. Essentially all of the surfactant added to stabilize the colloidal suspension is absorbed on the surface of the magnetite particles and not free to interact at the oil/water interface. Ferrofluid 1109 (Ex. 1–6) contains 11% oleic acid by volume, equivalent to a concentration of 0.35 mole/liter of solution, yet passing the spreading test indicates a concentration of free oleic acid less than 0.01 mole/liter, and probably far less.

To demonstrate that the proportion of carrier may be varied greatly, without affecting ferrofluid stability, ferrofluids 1102 and 1103 were obtained from ferrofluid 1101 by vacuum distillation removal of carrier liquid.

In another instance, a ferrofluid originally formulated with a substantial excess of surfactant was adjusted down in spreading coefficient to the 20 dynes/cm. level by contacting the ferrofluid with activated charcoal. (This ferrofluid later became ferrofluid 1109.)

The above ferrofluids were, of course, formulated so that all exhibited a spreading coefficient less than 20 dynes/cm. against distilled water at room temperature. However, determination of whether a candidate ferrofluid meets this criterion can be done by the relatively simple pass-fail test outlined below.

An aliquot of ferrofluid is dissolved in a non-spreading oil of known negative spreading coefficient using a dilution ratio which depends on the coefficient of the oil (20/S.o. where S.o. is the spreading coefficient of the oil). In tests on the above ferrofluids, one volume of ferrofluid was diluted with 12.5 volumes of mixed cis and trans decahydronaphthalene (Fisher Scientific Co.) which measured a spreading coefficient of −1.4 dynes/cm. against distilled water (by ASTM method D–1331 [1965]).

A drop of the mixture is placed on water surface in a glass vessel that was carefully cleaned in chromic acid and rinsed with distilled water. If the drop does not spread, the original ferrofluid has a sufficiently low spreading coefficient for the present purposes. If this drop spreads, the spreading coefficient of the ferrofluid is in excess of 20 dynes/cm. and the ferrofluid is not considered very suitable for practice of the present invention for those applications where a high degree of surface activity is not desirable.

EXAMPLE II

Some available ferrofluids were tested by the above described spreading coefficient test to determine suitability for ballast water separation. None passed. These ferrofluids are described in Table II.

TABLE II.—FERROFLUIDS NOT APPLICABLE

| | Examples | | |
|---|---|---|---|
| | 2-1 (1112) | 2-2 (1088) | 2-3 (1059) |
| Magnetite: | | | |
| Size, A | 88 | 87 | 80. |
| Concentration [1] | 12.2 | 3.6 | 2.0. |
| Stabilizing agent | PBISA | Tenlo 70 | Oleic acid. |
| Concentration [1] | 46.5 | 8.7 | 7.0. |
| Carrier | Kerosene | Kerosene | Kerosene. |
| Concentration [1] | 40 | 88 | 91. |
| Density, gm./cm.$^3$ (25° C.) | 1.27 | 0.894 | 0.875. |
| Kinematic viscosity, cs. (30° C.) | 6,800 | 2.5 | 1.7. |
| Initial susceptibility | 0.78 | 0.27 | 0.07. |
| Saturation magnetization, gauss. | 368 | 108 | 55. |
| Spreading coefficient against distilled water. | Passes test | Does not pass test. | Does not pass test. |
| Average particle diameter, angstroms. | 88 | 87 | 80. |

[1] Volume percent.

Ferrofluid 1059 differs from ferrofluid 1109 principally in the concentration of free oleic acid. Percolation of ferrofluid 1059 through a column filled with activated charcoal granules removed virtually all of the free oleic acid and the ferrofluid was then employed to prepare 1109.

Ferrofluid 1088 shows that the surfactant must be firmly attached to the magnetic particle surfaces, reversible adsorption is not desirable. The surfactant used in this instance, Tenlo-70 is described by the manufacturer (Diamond Shamrock Corp.) as an oil soluble, non-ionic, condensation product of an amino ester of a fatty acid. With this surfactant (and a kerosene carrier) a substantial free surfactant content has been required to maintain a stable dispersion of colloidal magnetite.

Aside from failing the spreading coefficient test, ferrofluid 1088 exhibited a related disability. Specifically, substantial dilution induced flocculation of the magnetite particles. In terms of emulsion treatment, considerable dilution of the ferrofluid (in the hydrocarbon oil, for example) is contemplated and the ferrofluid should be dilutable to almost any degree by a liquid miscible therewith without flocculating.

Ferrofluid 1112 is included to demonstrate that the paritcle content can be increased to what is an essentially non-usable level as a practical matter without destroying colloid stability or upsetting the spreading coefficient test. Ferrofluid 1112 was prepared by vacuum evaporation of the carrier liquid from ferrofluid 1102.

EXAMPLE III

This example shows that practice of the invention is limited to ferrofluids, i.e. stable colloidal dispersions of magnetic particles of an extremely small size range distribution, i.e., less than about 1000 A., below about 300 A. for magnetite.

A commercial grade of magnetite powder (MO 4332— Minerals Pigments and Metals Division of Charles Pfizer & Co.) was dispersed in a solution of oleic acid and decahydronaphthalene in the following volume fraction proportions:

| | |
|---|---|
| Magnetite | 0.030 |
| Oleic acid | 0.004 |
| Decahydronaphthalene | 0.966 |

The specific area of the mangetite particles is 12.5 m./gm., a much lower value than the 75 m./gm. of particles present in ferrofluids. The above oleic acid concentration corresponds to about a monolayer of oleic acid on the particle surfaces.

A 50-cc. sample of the above mixture in a test tube shaken for 1 hour at 280 cycles/min. in a reciprocating shaker aliquot of the (black) suspension was removed from the tube and one drop placed on a distilled water surface (in a Petri dish). The drop did not spread. Additional suspension to a total of about 0.5 cc. was added. The suspension formed a floating black lenticular drop with the magnetite remaining in the oil phase. Thereafter, a hand magnet (gap field 2000 oe.) was brought close to the suspension which caused agglomeration of the magnetite and attraction to the magnet, leaving behind a clean lens of oil floating on the water. Only a small fraction of the oil was removed with the magnetic particles by the magnet.

EXAMPLE IV

This example demonstrates qualitatively that emulsions can be separated (or at least one phase concentrated) by application of magnetic forces.

TEST 1

Emulsions of crude oil, (mixed sweet crude, vis. 4 cp. at 30° C., 0.83 g./cm.$^3$ 25° C.) magnetized with a kerosene based ferrofluid (3.5% magnetite, 10.0% PIBA by volume) were pumped through a pair of beds of 50- to 80-mesh cobalt powder, equal quantities of oil passing through each bed. One bed was held between the poles of a permanent magnet, the second bed being unmagnetized. Initially, the beds were filled with distilled water.

Emulsion Composition A

| | Ml. |
|---|---|
| Water | 99 |
| 10 gauss crude oil (10:1 oil to ferrofluid) | 1 |
| Tween 80 | 0.2 |

RESULTS

| Volume effluent, ml. | Percent oil in effluent | |
|---|---|---|
| | Magnetized bed | Unmagnetized bed |
| 3 | 0 | 0 |
| 6 | 0.001 | 0.012 |
| 9 | 0.028 | 0.054 |
| 12 | 0.018 | 0.110 |
| 15 | 0.052 | 0.150 |

Emulsion Composition B

| | Ml. |
|---|---|
| Water | 99 |
| 1.0 gauss crude oil (100:1 oil to ferrofluid) | 1 |
| Tween 80 | 0.2 |

RESULTS

| Volume effluent, ml. | Percent oil in effluent | |
|---|---|---|
| | Magnetized bed | Unmagnetized bed |
| 3 | 0 | 0 |
| 6 | 0.006 | 0.006 |
| 9 | 0.024 | 0.003 |
| 12 | 0.040 | 0.053 |
| 15 | 0.053 | 0.087 |
| 18 | 0.067 | 0.116 |

Emulsion Composition C

| | Ml. |
|---|---|
| Water | 99 |
| 0.1 gauss crude oil | 1 |
| Tween 80 | 0.2 |

RESULTS

| Volume effluent, ml. | Percent oil in effluent | |
|---|---|---|
| | Magnetized bed | Unmagnetized bed |
| 3 | 0 | 0 |
| 6 | 0 | 0.010 |
| 9 | 0.031 | 0.081 |
| 12 | 0.059 | 0.270 |
| 15 | 0.091 | 0.33 |
| 18 | 0.128 | 0.36 |

Conclusions (1) The magnetized beds are more efficient demulsifiers than unmagnetized beds.

(2) Even at very low magnetization of the oil, the demulsification efficiency is 2 to 3 times as high as it is in the absence of the magnetic field.

TEST 2

Emulsions of fluorocarbon/water were formed using the fluorocarbon ferrofluid 2 described in the Journal of Applied Physics, vol. 41, No. 3, 1964–1072 containing 2.7% Magnetite, 6.8% Freon E–3, HFPO Hexamer Acid 90.5%. Again, the emulsion was passed through a pair of cobalt powder beds, one between the poles of a permanent magnet (having an air field of 3000 gauss). Initially, the beds were filled with distilled water.

Emulsion Composition

| | Ml. |
|---|---|
| Water | 98 |
| Aqua ammonia | 1.6 |
| 83 gauss fluorocarbon | 1.0 |
| HFPO acid | 0.2 |

RESULTS

| Volume effluent, ml. | Percent oil in effluent | |
|---|---|---|
| | Magnetized bed | Unmagnetized bed |
| 3 | | |
| 6 | | |
| 9 | | |
| 12 | 0 | 0.018 |
| 15 | 0.0022 | 0.050 |
| 18 | 0.0030 | 0.099 |

Conclusions

The magnetic fields aid the coalescence of a magnetized fluorocarbon in water emulsion.

TEST 3

The object of this test is to demonstrate qualitatively the effect of a magnetic field gradient on a magnetized emulsion, using an equal part (by volume) mixture of the oil and ferrofluid of Test 1. A hollow conduit, rectangular in cross section, was placed in a magnetic field with a uniform gradient which ranged from 6,300 oe. at the bottom of the conduit to 4,000 oe. at the top of the conduit. The magnetic field lengthwise and across the conduit was essentially constant. At one end, outlet 1 removed fluid from the top of the conduit; outlet 2 from the bottom. At the other end, a centrally located inlet fed fluid to the conduit. Initially, the conduit was filled with distilled water.

Emulsion

| | Ml. |
|---|---|
| Water | 99 |
| 64 gauss crude oil | 1 |
| Tween 80 | 0.2 |

RESULTS

| | Percent oil | |
|---|---|---|
| | Outlet No. 2 H 6,300 oe. | Outlet No. 1 H 4,000 oe. |
| Sample No.: | | |
| 1 | 0.72 | 0.37 |
| 2 | 0.70 | 0.37 |
| Average | .54 | |

Conclusions (1) The magnetized oil droplets migrated to the strong part of the field.

(2) Part of the oil was retained in the strong part of the field since only about half of the entering oil left by the two outlets.

TEST 4

The procedure of Test 3 was repeated with a magnetized fluorocarbon (same as in Test 2 diluted with nine parts of perfluorotributyl amine) in kerosene emulsion. The conduit was first filled with kerosene.

Emulsion

| | Ml. |
|---|---|
| Kerosene | 98 |
| 8.3 gauss fluorocarbon | 1 |
| Acryloid 917* | 1 |

*Lauryl methacrylate polymer.

RESULTS

| | Percent fluorocarbon | |
|---|---|---|
| | Outlet No. 1 | Outlet No. 2 |
| Sample No.: | | |
| 1 | 0.24 | 1.09 |
| 2 | 0.58 | 0.91 |
| Average | 0.41 | 1.00 |

Conclusions

The magnetized fluorocarbon droplets migrate to the strong part of the magnetic field, are retained there and then separated from the kerosene.

TEST 5

This test shows that an emulsion formed with a magnetic external phase (ferrofluid of Test 1) and a non-magnetic internal phase can be broken magnetically.

Procedure

The emulsion was pumped through two beds filled with ball bearings of 1/8" diameter. One bed was held between the pole pieces of a magnet having an air field of 3000 gauss. The second was not magnetized. Both beds were filled with kerosene prior to introducing the emulsion.

Emulsion

| | Ml. |
|---|---|
| 100 gauss kerosene | 80 |
| Water | 20 |

RESULTS

| | Percent water in effluent | |
|---|---|---|
| | Magnetized bed | Unmagnetized bed |
| Volume effluent: | | |
| 6 | 30.4 | 20.4 |
| 12 | 25.0 | 19.6 |
| Average | 27.6 | 20.0 |

Conclusions

A magnetized external phase of an emulsion can be separated from a non-magnetic internal phase.

TEST 6

This test illustrates separation of an emulsion containing two internal phases, one internal phase being magnetized.

Procedure

An emulsion of the crude oil in water was mixed with some of the Test 2 emulsion of magnetized fluorocarbon in water. The mixed emulsion was passed through two cobalt powder beds. One bed was held between the pole pieces of a magnet leaving an air field of 3000 gauss. The second bed was not magnetized. Both beds were filled with water prior to introducing the emulsion.

EMULSIONS

| | A | B |
|---|---|---|
| Water, ml | 99 | 99 |
| Tween 80, ml | 0.4 | 0.4 |
| Crude oil, ml | 1 | |
| 8.3 gauss fluorocarbon, ml | | 1 |

RESULTS

| Volume effluent, ml. | Oil from magnetized bed/oil from unmagnetized bed | Fluorocarbon from magnetized bed/ fluorocarbon from unmagnetized bed |
|---|---|---|
| 3 | | |
| 6 | | |
| 9 | 0.42 | 0.23 |
| 12 | 0.64 | 0.00 |
| 15 | 0.75 | 0.24 |
| 18 | 0.94 | |

Conclusions

The magnetized droplets are removed much more effectively than the non-magnetized are, in the magnetized bed relative to the non-magnetized bed.

TEST 7

This test illustrates the separation of a magnetized water in kerosene emulsion.

Procedure

An emulsion of aqueous ferrofluid in kerosene was passed through two beds of cobalt powder (50 to 80 mesh); one being held between poles of a permanent magnet, having an air field of 3000 gauss, the second bed being unmagnetized. Before pumping the emulsion into the two beds, the beds were filled with kerosene.

Emulsion Composition

| | Ml. |
|---|---|
| Water-based FF | 1.0 |
| Span 80 | 0.4 |
| Kerosene | 99.0 |

The aqueous phase was a dilute ionically stabilized ferrofluid. It was a dilute colloidal suspension of magnetite (0.3% by volume) in dilute HCl (pH=1.4) similar to the suspension prepared over thirty years ago by Elmore [Phys. Rev. 54, 309 (1938)]. The ferrofluid had a magnetization of 10 gauss at 7600 oe., Span 80 which was used to form a stable water in oil emulsion commercial grade of sorbitan mono-oleate [Atlas Chemical Co.].

The kerosene used in all the test was the Bayol 35 grade of odorless kerosene (Enjay).

RESULTS

| Volume effluent, ml. | Percent water in effluent | |
|---|---|---|
| | Magnetized bed | Unmagnetized bed |
| 5 | .0084 | .0093 |
| 10 | .214 | .205 |
| 15 | .271 | .523 |
| 20 | .205 | .700 |
| 25 | .121 | .841 |
| 30 | .093 | |
| 35 | .005 | |

Conclusions

The magnetized bed removed the aqueous FF much more effectively than the unmagnetized bed.

EXAMPLE V

This example shows that essentially all of a hydrocarbon based ferrofluid can be removed from a wide range of aqueous substrates.

A series of tests were run, each with a tared 14 cm. diameter Petri dish filled with water and weighed on a balance sensitive to 0.1 gm. to ascertain the weight of water. A small quantity of ferrofluid was dropped on the water surface and its weight determined. After about 2 minutes, the diameter of the ferrofluid slick was estimated, allowing also the thickness of the slick to be estimated.

Thereafter a C-shaped hand magnet-gap field 4300 oe., gap volume 1.5 cm.$^3$ (gap width 0.76 cm., length 0.63 cm., depth 3.1 cm.) was brought down close to the surface of the slick, which attracted the ferrofluid slick and caused its removal from the water. The change in gross weight of the Petri dish was then determined.

The ferrofluids tested were ferrofluids 1102, 1104, 1105, and 1108. The aqueous substrates employed were distilled water, Lowell (Mass.) tap water, and standard buffer solutions pH 6, pH 7, pH 8, of 0.05 molar solutions monosodium phosphate and sodium hydroxide (Fisher Scientific Co.). Sea water was unavailable at the time these tests were run.

In all tests essentially all of the ferrofluid was removed by bringing the magnet just above the liquid surface, even through the ferrofluid slick was quite thin (<1 mm. and as little as 0.1 mm.). The quantity of material removed by the magnet exceeded the weight of ferrofluid added, due to inclusion of some water with the ferrofluid taken up by the magnet. Removal of ferrofluid was almost complete. Left behind in all instances was only a transparent brownish film (more or less discontinuous). The thickness of the residual film was estimated as not more than a few microns.

All told, the behavior of the ferrofluid, magnetic pickup of the ferrofluid and the quantity of unrecoverable residue did not differ materially with any of the aqueous substrates nor with the different ferrofluids.

EXAMPLE VI

This example shows that very dilute ferrofluids can be controlled by application of magnetic forces and that ferrofluids can be diluted to a very great extent without affecting colloid stability.

The equipment employed included a 14-cm. Petri dish and an electromagnet with a 4.5-inch gap. The magnetic field along the horizontal line bisecting the gap was known as a function of the applied current and distance from the center of the magnet. The Petri dish was filled with water (distilled) and placed next to the pole pieces of the magnet so that the water level was in the same horizontal plane as the center of the magnet.

In consequence, a drop of ferrofluid placed on the water surface along the center line bisecting the gap would be subjected to a uniaxial magnetic force (of known magnitude) tending to pull the drop toward the magnet.

By keeping the drop volume $v$ constant (0.025 ml. during these tests) the magnetic force on a drop of given ferrofluid becomes solely a function of the local field, and that in turn is an already known function of the current applied to this electromagnet and the distance of the drop center from the magnet.

Since the resistance to initial motion would be due principally to adhesion of the drop to water (interfacial forces) and to inertial forces, test results on diluted ferrofluids would show first whether the drop is still a ferrofluid (i.e., uniformly magnetic). Any substantial particle segregation in the drop of fluid would affect the behavior of the drop. In addition, this test shows the extent of dilution possible before magnetic susceptibility decreases to the point of no magnetic response.

By systematically diluting an aliquot of ferrofluid 1102 with tetradecane, ferrofluids of decreasing magnetic concentration were obtained. The magnetite concentrations and magnetic properties were calculated from the dilution ratios. For this series of tests, a drop volume of 0.025 ml. was employed, and each drop formed a lens on the water surface with a diameter (D) of about 0.5 cm. The experimental results are summarized in Table III below.

The below tabulated results demonstrate that extremely dilute ferrofluids are magnetically attracted. Ferrofluid 1102 C. is $10^4$ times more dilute than the parent ferrofluid 1102.

1102 C. is $10^4$ times more dilute than the parent ferrofluids were stable. The drops moved toward the magnet in a manner consistent with uniform dispersion therein of the magnetite and with no visual evidence of particle segregation or agglomeration.

A second set of tests were run with the same equipment. In each test, a drop of oil (non-magnetic) was placed 7¾″ from the magnet, and the magnet drew 50 amps. At this point the magnetic field (H) was 550 oe. while the local horizontal field gradient was 75 oe./cm.

In the first test, a 0.025 ml. drop of tetradecane was placed on the water. It did not move. Then an equal sized drop ferrofluid 1102 A was added to the sessile drop of tetradecane. The large drop of combined liquid immediately moved as whole toward the magnet.

In a second like test, about 0.5 ml. of No. 6 oil was carefully placed on the surface of a water sample (which previously had been in contact with the oil). The sample did not spread, forming instead a sessile drop about 1.5 cm. in diameter. The magnetic field had no effect on this drop (nor had it any affect on the tetradecane). A 0.025 ml. drop of ferrofluid 1102 was added to the No. 6 fuel oil drop. The combined drop immediately started moving as a body toward the magnet.

EXAMPLE VII

In a set of test runs, 5 gms. of water, 2 gms. of oil were placed in each of two 15 ml. graduated centrifuge tubes. About 2 gms. of methyl cyclohexane based ferrofluid (ferrofluid 1105 density 1.069, viscosity at 30° C. 54 cps., magnetization at 10,000 oe. of 173 gauss), was added to one tube, an equal quantity of methyl cyclohexane above to the second tube. All the tubes were shaken mechanically for 20 minutes and the degree of emulsification noted. Tube 1 was placed in a strong magnetic field gradient of about 4 Koe./cm. (field was about 12 Koe.) for 15 minutes and the magnetically squeezed out water removed with a pipette and weighed. The same tube was then centrifuged for 15 minutes at about 1700 g. and the additional quantity of recovered water measured. The second tube was centrifuged and the quantity of water recovered was determined.

The characteristics of the oils used are given in Table IV-A, the test results in Table IV-B and the control results in Table IV-C.

TABLE IV-A.—OILS USED FOR EMULSIFICATION STUDY

| Oil | Density, g./ml. at 25° C. | Viscosity, cp. at 30° C. |
| --- | --- | --- |
| No. 6 fuel oil, Texaco | 0.96 | 2,000 |
| No. 2 fuel oil, Texaco | 0.86 | 3 |
| Texaco 20-20-W detergent motor oil | 0.88 | 100 |
| Methycyclohexane | 0.77 | 1.4 |

TABLE IV-B.—MAGNETIC EMULSION BREAKING EXPERIMENTS

| Test | Oil used | Water recovered magnetically percent water added | Water recovered by subsequent centrifuging, percent | Percent water not recovered | Emulsion formed |
| --- | --- | --- | --- | --- | --- |
| 1 | No. 6 | 73 | 2 | 25 | Moderate. |
| 2 | No. 2 | 97 | 3 | None | Slight. |
| 3 | 20-20-W | 106 | 4 | −10 | Heavy. |
| 4 | No. 6 | 34 | 12 | 54 | Do. |

TABLE III.—HORIZONTAL MOTION OF A DILUTE FERROFLUID AS A FUNCTION OF APPLIED FIELD

| Ferrofluid* | Magnetite conc. vol. fractions | Ferrofluid saturation magnetization, gauss | Applied current, amps | Initial distance of drop from center of magnet-X | Magnetic field H at X, oersted | Horizontal magnetic field gradient, oe./cm. | Fluid magnetization M in a field H, gauss | Magnetic forces on drop, dynes | 0.025 cm.³ drop moves toward magnet |
| --- | --- | --- | --- | --- | --- | --- | --- | --- | --- |
| 1102-A | 6.4×10⁻⁴ | 1.84 | 7.5 | 7.75 | 116 | 19 | 0.40 | 1.5×10⁻² | No. |
| 1102-A | 6.4×10⁻⁴ | 1.84 | 4.0 | 7.00 | 80 | 26 | 0.30 | 1.5×10⁻² | No. |
| 1102-A | 6.4×10⁻⁴ | 1.84 | 2.5 | 5.50 | 92 | 16 | 0.35 | 1.1×10⁻² | No. |
| 1102-A | 6.4×10⁻⁴ | 1.84 | 5.0 | 5.50 | 185 | 32 | 0.55 | 3.5×10⁻¹ | Yes. |
| 1102-A | 6.4×10⁻⁴ | 1.84 | 1.0 | 3.25 | 140 | 78 | 0.51 | 8.0×10⁻¹ | Yes. |
| 1102-B | 7.2×10⁻⁵ | 0.21 | 30.0 | 7.75 | 430 | 57 | 0.92 | 1.1×10⁻² | No. |
| 1102-C | 1.4×10⁻⁶ | 4.1×10⁻² | 50.0 | 7.75 | 550 | 75 | 0.021 | 3.2×10⁻³ | No. |
| 1102-C | 1.4×10⁻⁶ | 4.1×10⁻² | 50.0 | 4.00 | 2,900 | 790 | 0.033 | 5.2×10⁻¹ | Yes. |

*Ferrofluid 1102 diluted with tetradecane. Volume concentration magnetite in Ferrofluid 1102=0.015. Saturation magnetization erroflud 1102=43 gauss.

TABLE IV-C.—CONTROL EMULSION BREAKING EXPERIMENTS

| | | Centrifuge at 1,700 g. | |
| --- | --- | --- | --- |
| Test | Oil and solvent—Oil used | Water recovered by centrifuge, percent of water added | Emulsion formed |
| 1 | No. 6 | (ᵃ) | Moderate. |
| 2 | No. 2 | 100 | Slight. |
| 3 | 20-20-W | 110 | Heavy. |
| 4 | No. 6 | 104 | Moderate. |

ᵃ Tube broken, sample lost.

Tests 1 and 4 were run on the same No. 6 fuel oil. As a whole, the tests indicate that for refined petroleum products, e.g., lube oil and No. 2 fuel oil, recovery in a substantially water free state by magnetic techniques may be expected. High speed centrifuging (1700 g.) could remove little more water either on the control or on the test subsequent to magnetic removal. The tests on No. 6 fuel oil indicate that the recovered oil may be loaded with water, but that a substantial degree of oil removal can be attained magnetically even from viscous oils.

EXAMPLE VIII

In a non-quantitative test, a commercial salad oil (mixed cottonseed oil and corn oil) was mixed with different ferrofluids. First, a dinonyl-phthalate based ferrofluid which had the following composition: 14% magnetite, 45% of an ethylene oxide additive of octyl phenol (Triton–X–45), balance dinonylphthalate was mixed with the salad oil. This ferrofluid did not disperse in the salad oil.

The second ferrofluid attempted was a kerosene base dispersion of magnetite (4%) stabilized by (10%) sorbitan mono-oleate (Span–80). This ferrofluid mixed readily with the salad oil and the mixture was emulsified in water by a high speed blender to form a stable emulsion. The emulsion (about 2% oil in water) was passed through a packed cobalt powder bed, using the equipment of test 1 of Example IV. When the bed was magnetized, the initial effluent was clear, demonstrating magnetic removal of oil phase. After removing the bed from the magnet, emulsified oil was present in the effluent. The bed was then replaced in the gap which resulted in clear effluent again.

This qualitative test demonstrates crudely that the ferrofluid must be matched to the component of the mixture which is to be magnetized. Also, salad oil was selected as representative of typical non-hydrocarbon oils, and as representative of the triglyceride oils which are commonly used in metal processing oils, i.e., animal and vegetable oils and fats.

Although the specific equipment involved in a magnetic separation of multiphase liquid mixtures forms no part of the present invention, a simplified form of equipment generally contemplated for practice of the invention can be described to further explain practice of the invention. Thus, one readily visualizable mode of equipment is diagrammatically illustrated in the attached drawing, wherein:

FIG. 1 is a side section through the magnetic emulsion breaking system;

FIG. 2 is a section taken along lines 2—2 of FIG. 1; and

FIG. 3 is an enlarged diagrammatic view of the packing elements in the separator.

Referring now to the drawing, it may be seen that the emulsion breaking system 10 includes an elongated separator vessel 12 containing therein a radial electromagnet 14. Electromagnet 14 comprises an axial water (or air) cooled copper tube 16 through which an electric current passes, the electric cables being shown at 18 and 20 and the cooling outlet at 22. In the annular space between copper tube 16 and the wall of vessel 12 are a plurality of magnetic steel (stainless) fins 24 which extend outward of tube 16 as radial segments. The radial segment spaces between fins 24 are all loosely packed, either entirely or (as shown by FIG. 3) at spaced apart intervals with a magnetic steel wool or steel fabric packing 26 (preferably made of a magnetic stainless steel).

The emulsion enters by way of top inlet 28, then is spread uniformly across vessel 12 by foraminous spreader plate 30 for passage through electromagnet 14, wherein the emulsion is magnetically separated into magnetic and non-magnetic phases. The non-magnetic phase (e.g., water) collects in the outer regions of vessel 12 being drawn off by way of outlet line 32. The magnetic phase (e.g., oil) collected at the center of vessel 12 enters a collecting chamber 34 and is drawn off through central outlet to recovery tank 38. A magnetic levitation flow control valve 40 allows flow only when magnetic fluid fills the lower portions of collecting chamber 34.

The above described construction of electromagnet 14 creates intense electromagnetic forces and sharp field gradients. According to electromagnetic theory, the current I passing through copper tube 16 creates a magnetic field H whose strength depends on the radial distance R from tube 16, i.e., $$H = \frac{I}{5R}$$

Since the area around tube 16 largely packed by fins 24 and packing 26 with permeable material of high enough saturation magnetization and permeability to consume little magnemotive force, the field equation becomes $$H = \frac{I}{5\gamma R}$$

where $\gamma$ is the fraction of open space.

The field gradient equation becomes $$\frac{dH}{dR} = \frac{-I}{5\gamma R^2} + \frac{d\gamma}{dR}\frac{I}{5R}$$

and if $\gamma$ is kept constant $$\frac{dH}{dR} = \frac{-1}{5\gamma R^2}$$

The field gradient tends to draw the magnetic material towards the axis. In addition, substantial local field gradients will exist inside the porous packing elements 26 since the steel fibers themselves will be essentially saturated and the surrounding open space has a lower field value. The local field gradients are estimated to be of the order of $10^4$ oe./cm., possibly $10^5$ oe./cm.

Accordingly, when an emulsion of magnetized oil and water, for example, passes through the wedge shaped steel wool packed passages of electromagnet 14, the intense local field gradients at the packing cause individual droplets of the magnetized oil to be attracted to the fibrous surfaces and coalesce there into larger drops. At the same time, the radial field gradient pulls the magnetic material radially. In flowing down through electromagnet 14, the oil is coalesced into a separate phase and drawn axially to copper tube 14. Conversely, the non-magnetic water is displaced radially out toward the periphery of vessel 12. The entrance to collecting chamber 34 serves as a weir to separate the water from the oil collected around copper tube 16.

Since no vertical field gradients exist in electromagnet 14, the magnetized oil flows downward therethrough as a normal liquid. Only at the bottom end of electromagnet are the vertical field gradients material, and there the magnetic head is small, being estimated at about 4 cm. (for a 1% by volume magnetite content saturation magnetization about 56 gauss).

The above discussion has been largely directed to removal of the magnetized oil from suspension in water. The mode of equipment illustrated is adapted for this purpose. Little if anything has been said with regard to removing water from the magnetized oil, i.e., breaking a water-in-oil emulsion, or dewatering the recovered oil. Actually, this particular separation is inherent in operation of the equipment described above. Applying the intense magnetic field gradients adjacent copper tube 16 to a dilute ferrofluid, e.g., the ferrofluid/oil mixture, sharply increases the apparent density of the ferrofluid. Water present therein is literally squeezed out. What happens is that the water soaked hydrocarbon oil initially attracted to the magnetized surface gradually loses water content as it flows down through electromagnet 14. The heat generated by passing current (several thousand amperes) through tube 16 helps by warming the oil, reducing its viscosity. Even if the hydrocarbon oil/water emulsion passed through the magnetic separator system is the thixatropic chocolate mousse, magnetic separation will pass essentially dewatered oil to collector 34 and deoiled water out through water outlet conduit 32.

One aspect of the apparent density increase in magnetized oil in the presence of a magnetic field has been illustrated in the relief valve structure 40 shown in the drawing. Valve seat 42 is fixed to the wall of outlet line 36. The spherical valve body 44, which may be metallic (non-magnetic) and fairly dense normally seats, through its own weight and the pressure of the fluid in collection chamber 34 to seal off outlet line 36. However, when the separator system 10 is operating and an oil-ferrofluid mixture fills chamber 34, the magnetic field action on the oil actually levitates valve body 44 to whatever open position is allowed by the retainer structure 46, permitting oil to flow through valve 40 into tank 38. To flow oil out valve 40, the internal pressure in the separator system must of course be high enough to force the oil out of the magnetic field in outlet line 36.

The separate draw-off structure of chamber 34, outlet 32, etc., may be eliminated if an intermittent operation of the magnetic separator system is acceptable. Then, the electromagnet 14 is energized and emulsion passed through separator 10 only until packing elements 26 are essentially saturated with oil. Thereafter, electromagnet 14 is turned off and the oil flushed out into a collector vessel. The cycle can then be repeated.

I claim:
1. A method of separating a liquid-liquid emulsion which comprises adding to the emulsion a ferrofluid in quantities adequate to provide at least 0.005% by volume of magnetic particles of a size less than about 300 A., in one of the emulsion phases, said ferrofluid being preferentially soluble in one phase of the emulsion, thereby making such phase more magnetizable than the emulsion as a whole, thereafter applying magnetic forces to the emulsion adequate to concentrate such phase and then separating the magnetically concentrated portion from the emulsion as a whole.

2. The method of claim 1 wherein the emulsion is a petroleum oil/water emulsion.

3. The method of claim 1 wherein the emulsion is a lubricant/water emulsion.

4. The method of claim 1 wherein the emulsion is a fluorocarbon/water emulsion.

5. A method of breaking a petroleum oil/water mixture which comprises adding thereto a ferrofluid as hereinafter defined in quantities adequate to provide from 0.0001–4.0% by volume of magnetic particles of a size less than 300 A. in the mixture of oil and ferrofluid and thereafter applying magnetic forces adequate to separate the oil from the water, thereafter removing the oil, said ferrofluid comprising a stable colloidal dispersion of magnetic particles in a carrier hydrocarbon oil selected from the group consisting of $C_9$–$C_{21}$ aliphatic hydrocarbons and the saturated $C_7$–$C_{18}$ naphthenic hydrocarbons and mixtures thereof, stabilized by a water insoluble hydrocarbon soluble surfactant and present in such concentration that the ferrofluid as a whole has a spreading coefficient less than about 20 dynes/cm., measured at ambient with distilled water and wherein the mixture is a petroleum/water mixture and a water miscible ferrofluid is added thereto.

6. A method of breaking a petroleum oil/water mixture which comprises adding thereto a ferrofluid as hereinafter defined in quantities adequate to provide from 0.0001–4.0% by volume of magnetic particles of a size less than 300 A. in the mixture of oil and ferrofluid and thereafter applying magnetic forces adequate to separate the oil from the water, thereafter removing the oil, said ferrofluid comprising a stable colloidal dispersion of magnetic particles in a carrier hydrocarbon oil selected from the group consisting of $C_9$–$C_{21}$ aliphatic hydrocarbons and the saturated $C_7$–$C_{18}$ naphthenic hydrocarbons and mixtures thereof, stabilized by a water insoluble hydrocarbon soluble surfactant and present in such concentration that the ferrofluid as a whole has a spreading coefficient less than about 20 dynes/cm., measured at ambient with distilled water and wherein the mixture is a lubricant/water mixture and a water miscible ferrofluid is added thereto.

7. A method of breaking a petroleum oil/water mixture which comprises adding thereto a ferrofluid as hereinafter defined in quantities adequate to provide from 0.0001–4.0% by volume of magnetic particles of a size less than 300 A. in the mixture of oil and ferrofluid and thereafter applying magnetic forces adequate to separate the oil from the water, thereafter removing the oil, said ferrofluid comprising a stable colloidal dispersion of magnetic particles in a carrier hydrocarbon oil selected from the group consisting of $C_9$–$C_{21}$ aliphatic hydrocarbons and the saturated $C_7$–$C_{18}$ naphthenic hydrocarbons and mixtures thereof, stabilized by a water insoluble hydrocarbon soluble surfactant and present in such concentration that the ferrofluid as a whole has a spreading coefficient less than about 20 dynes/cm., measured at ambient with distilled water and wherein the mixture is a fluorocarbon/water mixture and a fluorocarbon miscible ferrofluid is added thereto.

References Cited

UNITED STATES PATENTS

| | | | |
|---|---|---|---|
| 3,635,819 | 1/1972 | Kaiser | 210—40 |
| 3,657,119 | 4/1972 | Turbeville | 210—36 |
| 3,214,378 | 10/1965 | Hanneman | 252—62.52 |
| 3,281,403 | 10/1966 | Manuel et al. | 252—62.51 |
| 3,344,062 | 9/1967 | Kosar | 210—222 X |
| 3,531,413 | 9/1970 | Rosensweig | 252—309 X |

FOREIGN PATENTS

| | | | |
|---|---|---|---|
| 705,058 | 3/1954 | Great Britain | 252—62.52 |
| 756,563 | 9/1956 | Great Britain | 252—62.52 |

SAMIH N. ZAHARNA, Primary Examiner

T. G. WYSE, Assistant Examiner

U.S. Cl. X.R.

210—42, 65, DIG. 21; 252—62.51, 326, 329